United States Patent [19]

Chipman et al.

[11] 3,743,774

[45] July 3, 1973

[54] SYNCHRONIZING SIGNAL SEPARATION CIRCUIT

[75] Inventors: Jack R. Chipman; Joseph E. Morrow, both of Fort Wayne, Ind.

[73] Assignee: The Magnavox Company, Fort Wayne, Ind.

[22] Filed: July 12, 1971

[21] Appl. No.: 161,452

[52] U.S. Cl. ........ 178/7.3 S, 328/139, 178/69.5 TV

[51] Int. Cl. .............................................. H04n 5/10

[58] Field of Search ........................ 178/7.35, 7.5 S, 178/DIG. 12, 69.5 TV; 307/235, 234; 328/139

[56] References Cited

UNITED STATES PATENTS

| | | | |
|---|---|---|---|
| 2,752,422 | 6/1956 | Alexander | 178/7.3 S |
| 2,207,775 | 7/1940 | Bedford | 178/7.5 S |
| 2,313,915 | 3/1943 | Bedford | 178/7.5 S |

*Primary Examiner*—Robert L. Richardson

*Attorney*—Richard T. Seeger and R. M. Rickert

[57] ABSTRACT

A television receiver synchronizing signal separating circuit is disclosed having an improved active low pass filter for passing only vertical synchronizing signals, a passive high pass filter for passing horizontal synchronizing signals, and an amplifier which supplies both vertical and horizontal synchronizing signals to the filters after clipping and limiting a detected video signal to eliminate video information signals and noise respectively.

5 Claims, 5 Drawing Figures

INVENTORS
JACK R. CHIPMAN
JOSEPH E. MORROW
BY Jeffers and Rickert
ATTORNEYS

Patented July 3, 1973

3,743,774

2 Sheets-Sheet 2

INVENTORS
JACK R CHIPMAN
JOSEPH E. MORROW

BY Jeffers and Rickert
ATTORNEYS

SYNCHRONIZING SIGNAL SEPARATION CIRCUIT

BACKGROUND OF THE INVENTION

This invention relates to a circuit for extracting the synchronizing information from an incoming video signal and more especially to such a circuit for deriving vertical synchronizing signals which are not corrupted by horizontal synchronizing signals or noise. In the present invention, a composite of the vertical and horizontal synchronizing signals is first separated from the remaining video information signals, and then a vertical synchronization signal with high amplitude and energy and free of the horizontal synchronizing signal is derived. The derived vertical synchronizing signal allows synchronization of the vertical scanning generator of a television receiver with accurate vertical interlace throughout the synchronization hold-in range of the vertical scanning generator. The separation of vertical synchronization signals from horizontal synchronization signals is performed in such a manner as to improve the noise immunity of the vertical scanning generator.

Prior art schemes for separating the vertical and horizontal synchronizing signals employ an integration of the composite synchronization signal to obtain the vertical synchronizing signals usually by means of a low pass RC filter. Such a scheme provides a vertical synchronization signal with remnants of the horizontal synchronizing signals superimposed thereon. Even slight degradation of the leading edge of the vertical synchronizing signal impairs stable interlace requiring exact positioning of the vertical hold control. In most receivers, variation of the vertical hold control throughout its range reveals a number of settings where interlace is nonexistent and a similar number of settings where there is interlace. Such non-interlace or pairing will cause loss of half of the picture information.

SUMMARY OF THE INVENTION

In accordance with the present invention, a composite of vertical and horizontal synchronizing signals is derived by clipping and limiting a detected video signal to eliminate video information signals and noise respectively, and the thus clipped and limited signal is inverted and supplied to a passive high pass filter, the output of which is fed to the horizontal sweep generator. This inverted output is also supplied to an active low pass filter which passes only vertical synchronizing signals to a vertical sweep generator. The active low pass filter comprises a switching transistor in a common emitter configuration having a resistive voltage dividing network at its input and a shunt capacitance across the input so that horizontal synchronizing signals are insufficient to trigger the transistor; yet the transistor will be triggered in response to vertical synchronizing signals to provide a vertical synchronizing signal output pulse.

Accordingly, it is one object of the present invention to eliminate any trace of horizontal synchronizing signals super-imposed on vertical synchronizing signals.

It is another object of the present invention to improve the signal to noise ratio of vertical synchronizing signals.

It is a further object of the present invention to eliminate conventional integration procedures in obtaining a vertical synchronizing signal.

It is a salient object of the present invention to improve the noise immunity of the vertical scanning generator in a television receiver.

These and other objects and advantages of the present invention will appear more clearly from the following detailed disclosure read in conjuction with the accompanying drawings in which:

DESCRIPTION OF THE PREFERRED EMBODIMENT

Figure 1:
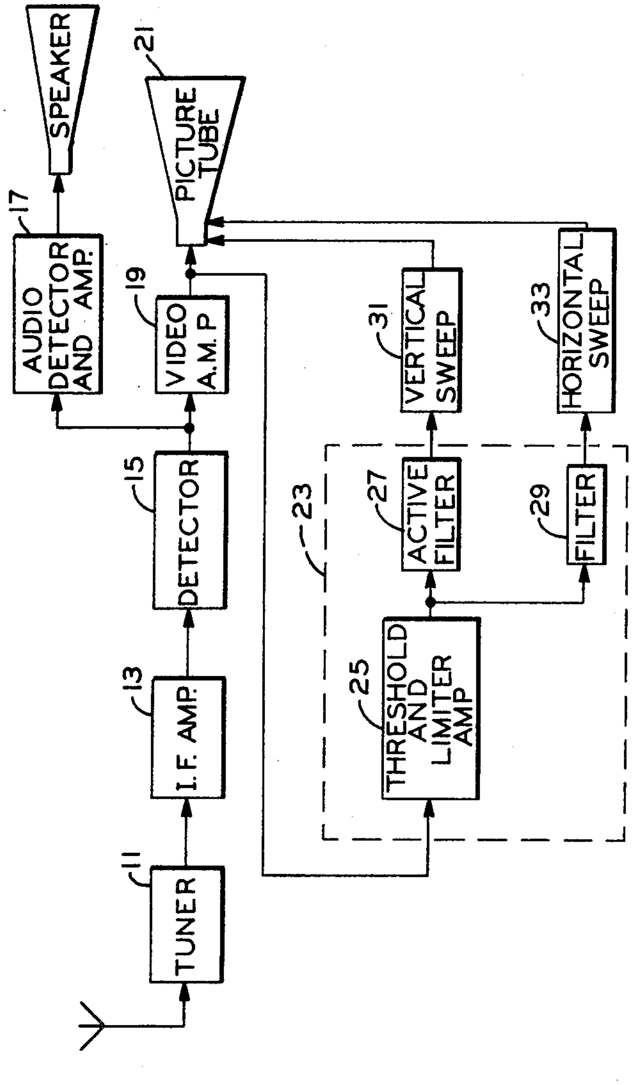
FIG. 1 is a block diagram of a television receiver employing the present invention.

Turning first to FIG. 1 which shows a somewhat standard television receiver, incoming signals are tuned, amplified and detected by tuner 11, intermediate frequency amplifier 13 and detector 15, respectively. After detection, the audio portion of the detected signal is separated off and passes through a second detection stage and is amplified and ultimately supplied to a speaker in the audio section 17. The video portion of the detected signal passes through a video amplifier 19 for ultimate display on the picture tube 21. The detected video signal also contains synchronizing information which may be separated from the video signal after amplification by a synchronizing signal separating circuit 23 which serves to not only separate the synchronizing information from the video information but also to separate the vertical synchronizing signals from the horizontal synchronizing signals. These respective synchronizing signals are then supplied to vertical and horizontal sweep generators 31 and 33 to control the sweeping or scanning of the beam within the picture tube 21. The details of the synchronizing signal separating circuit 23 are shown more completely in FIG. 2; however, basically this circuit consists of a threshold and limiter amplifier 25 which first separates a composite of the two synchronizing signals from the video information and blanking signals, and this composite is then separated by filters 27 and 29.

Figure 5:
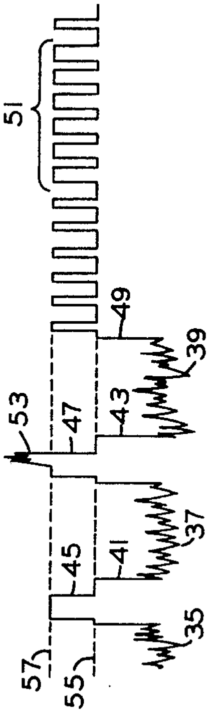
FIG. 5 illustrates a video signal waveform typical of the output of the video amplifier.
Figure 2:
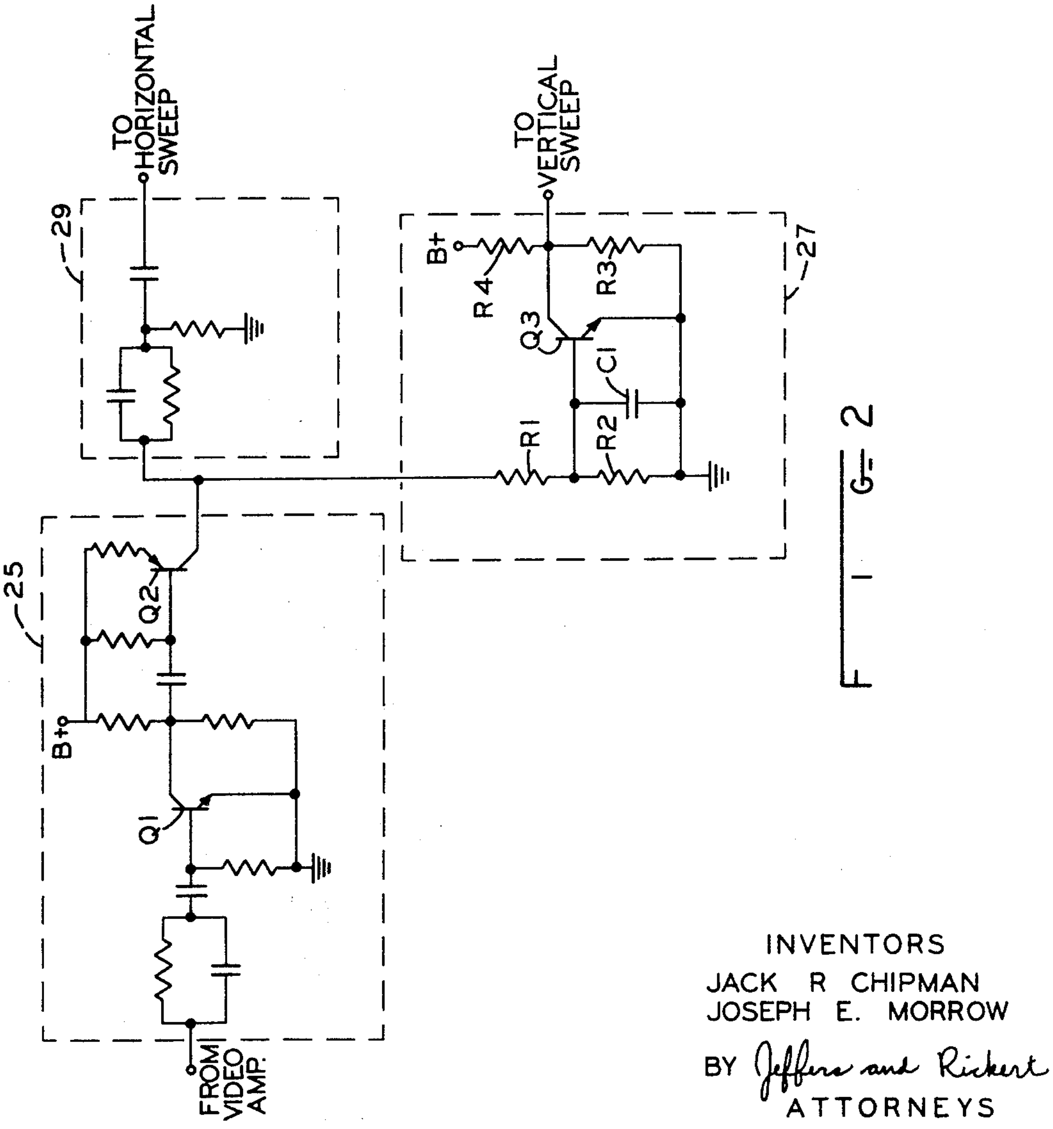
FIG. 2 is a schematic diagram of the synchronization separator of the present invention.

To better understand the operation of the circuit of FIG. 2, reference should first be made to the somewhat typical video signal waveform illustrated in FIG. 5. Such a video waveform would be typical of the output of the video amplifier 19 and contains video information signals 35, 37 and 39 which, as illustrated, would be the signals which modulate the intensity of the beam in the cathode ray tube during the last three horizontal scans of one of the fields. Between each of these scans is a blanking pulse 41 and 43 which functions to extinguish the beam during retrace. Superimposed on each blanking pulse is a horizontal synchronizing pulse 45 and 47 which, of course, serves to synchronize the horizontal sweep generator 33. At the end of the last horizontal scan 39 of a given field is also found a vertical blanking pulse 49 which has superimposed upon it a series of six equalizing pulses followed by a series of six vertical synchronizing pulses 51. These vertical synchronizing pulses, of course, serve to synchronize the vertical sweep generator 31.

A hypothetical spike of noise 53 is illustrated as superimposed upon the horizontal synchronizing pulse 47, and it should be clear from FIG. 5 that if only those signals exceeding a first predetermined value or threshold level represented by the dotted line 55 are passed, the video information signals and blanking signals may be readily eliminated; and, further, if a second threshold level represented by the dotted line 57 is established and only those signals less than this second predetermined threshold value are passed, most of the noise such as illustrated by the noise spike 53 will be eliminated from the synchronizing signals. The establishment of these two predetermined values 55 and 57 and elimination of all signals outside of the range between them is the function of the threshold and limiter amplifier 25 of FIGS. 1 and 2.

Turning now to FIG. 2, the incoming video signals from the video amplifier 19 are supplied to a transistor Q1 which functions somewhat like the well-known grid leak detection vacuum tube circuit to limit and clip the incoming video signals to thus separate synchronizing signals from video information signals. The output of the transistor Q1 which is a series of negative going synchronization pulses is inverted by a second transistor amplifier stage Q2 to provide an output from the threshold and limiter amplifier 25 which contains positive going vertical and horizontal synchronizing signals. This composite of synchronizing signals is supplied to two different filters 27 and 29 for separation purposes. The filter 29 is a high pass filter (differentiator) and passes the horizontal synchronizing signals to the horizontal sweep generator. As is well known, these horizontal synchronizing signals occur once for each scan of the picture tube or 15,750 times per second, whereas the vertical synchronizing signals occur at the much lower rate of 60 times per second which represents one for each vertical field or two vertical synchronizing signals (pulse groups) for each complete scan of the picture tube. Thus, since the horizontal synchronizing signals are a much higher repetition rate, they are easily separated by the passive filter circuit 29; and, further, if one of the vertical synchronizing pulses does reach the horizontal sweep generator, no real harm is done since a series of horizontal synchronizing signals usually precede the first visible line in a new field. To separate out and identify the vertical synchronizing signals is a more difficult task and is more critical to achieving a properly synchronized picture.

Figure 3:
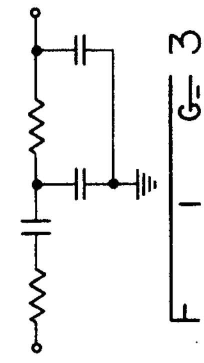
FIG. 3 illustrates one form of prior art filter used to obtain vertical synchronizing signals.
Figure 4:
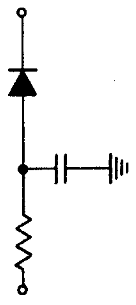
FIG. 4 illustrates another form of prior art filter for obtaining vertical synchronizing signals.

FIGS. 3 and 4 illustrate two prior art passive low pass filters which have been used functionally in the place of active filter 27 to obtain the vertical sweep synchronizing signals. The passive filters of FIGS. 3 and 4 function basically to integrate the vertical synchronizing signal which is a series of six pulses, and the vertical sweep generator synchronizes on the peak of this thus integrated synchronizing signal. Such an integrated signal waveform will have somewhat gently sloping leading and trailing edges, and it would be more desirable to have a vertical sweep synchronizing signal to supply to the vertical sweep generator 31 which was a clean pulse having abrupt leading and trailing edges so that the precise time of occurrence of the vertical synchronizing signal would be more readily identifiable by the vertical sweep generator 31. Such a clean pulse for synchronization purposes is provided by the active filter 27 shown in FIG. 2.

The positive going composite synchronization signal having both vertical and horizontal synchronizing pulses therein is applied to the resistive dividing network R1 and R2 which functions as a current source for the base of the switching transistor Q3. The capacitor C1 is in shunt with this transistor Q3 and has the effect of reducing the higher repetition rate horizontal synchronization components to a level which is inadequate to trigger the transistor Q3. The capacitor, however, has a much lesser effect on the lower repetition rate vertical synchronization signals, and the transistor Q3 will be triggered by these lower repetition rate signals.

To see why this is true, consider for a moment FIGS. 2 and 5 together. The occurrence of the pulse 45 will increase the charge on capacitor C1 and thus the base to emitter voltage on the transistor Q3; however, this increased voltage is not adequate to trigger the transistor, and during the time between pulse 45 and pulse 47, this voltage will be bled off by way of resistor R2. On the other hand, the vertical synchronizing signal consists of a series of pulses 51, each of which will increase the voltage across the capacitor C1; and since this series of pulses occurs in relatively rapid succession, there will be inadequate time for the voltage contributed by the first of the pulses to have leaked off before the second occurs further charging the capacitor C1 and, depending upon the specific parameters used, one of these pulses will be sufficient to increase the voltage on C1 to a point where the transistor Q3 conducts thus yielding its vertical synchronizing signal to the vertical sweep generator.

The base circuit time constant is quite short in comparison to that of the commonly used integrator circuit, for example, of FIG. 3, and the vertical synchronization pulses are sufficient to forward bias the base-emitter junction of the transistor Q3 causing it to conduct. The clearly formed vertical synchronization pulse which appears as the output is a negative going pulse which may be amplified and inverted prior to being supplied to the vertical sweep generator 31 depending upon the specific circuit requirements.

The transistor Q3 may thus also be thought of as a threshold device which provides an output pulse when its base to emitter voltage exceeds a predetermined threshold. The parallel combination of R2 and C1, of course, has a time constant sufficiently short that the voltage build-up on C1 due to horizontal synchronizing signals is not adequate to trigger Q3; however, the burst of vertical synchronizing pulses causes the voltage on C1 to build up sufficiently high to trigger the transistor Q3.

Thus, while the present invention has been described with respect to a specific embodiment, numerous modifications will suggest themselves to those of ordinary skill in the art. TV receivers may operate with either positive going or negative going synchronization signal requirements, and thus the phase inverter Q2 may not be necessary in some environments, and the interchange of NPN and PNP type transistors may be desirable. Also, any type of filter 29 for the horizontal synchronizing signals known in the prior art may be used. Accordingly, the scope of the present invention is to be measured only by that of the appended claims.

We claim:

1. A synchronizing signal separation circuit for use in a television receiver having horizontal and vertical synchronization requirements comprising:

amplifier means for separating synchronizing signals from video information signals and providing an output containing both vertical and horizontal synchronizing signals;

passive high pass filter means responsive to said amplifier means output to pass only horizontal synchronizing signals;

active low pass filter means comprising a switching transistor in a common emitter configuration having an input and an output, said input coupled to said amplifier means output; and a capacitor connected in shunt with said input.

2. The circuit of claim 1 wherein said amplifier means comprises threshold means responsive to incoming signals to pass only those signals having a magnitude exceeding a first predetermined value and limiter means for limiting the magnitude of the signals passed by said amplifier means to less than a second predetermined value.

3. The circuit of claim 2 wherein said amplifier means further comprises means for inverting the signals passed by said threshold and said limiting means.

4. The circuit of claim 1 further comprising resistance means in parallel with said capacitor, the time constant of said resistance means and capacitor parallel circuit being sufficiently short that the horizontal synchronizing signals are insufficient to charge said capacitor to a voltage sufficient to trigger said switching transistor.

5. In a synchronizing signal separation circuit for a television receiver having means for separating vertical and horizontal synchronizing signals from received video signals, an improved circuit for providing an output synchronizing signal only in response to the vertical synchronizing signals at its input comprising:

a threshold device having an input and an output and adapted to provide an output pulse only when the voltage at its input exceeds a predetermined threshold level; and a resistor and a capacitor connected in parallel, said parallel combination connected in parallel with said threshold device input and having a time constant sufficiently small to prevent the voltage across said capacitor exceeding said predetermined threshold in response to the receipt of horizontal synchronizing pulses, said time constant being sufficiently long that a burst of vertical synchronizing pulses builds up a voltage on said capacitor which exceeds said predetermined threshold.

* * * * *